UNITED STATES PATENT OFFICE.

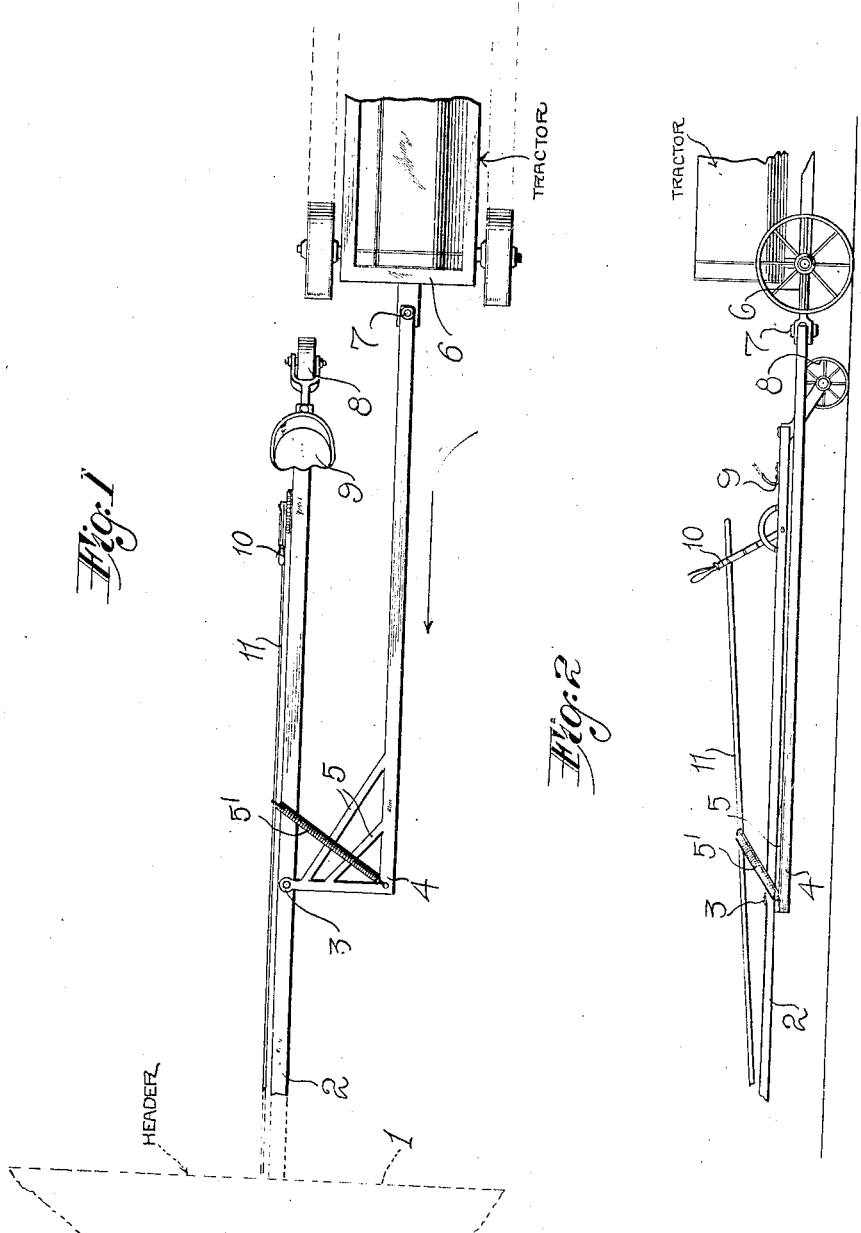

STEENER JOHN CARLSON, OF WHITE BUTTE, SOUTH DAKOTA.

HEADER-PUSHER FOR TRACTORS.

1,380,352.  Specification of Letters Patent.  Patented June 7, 1921.

Application filed December 9, 1919. Serial No. 343,684.

*To all whom it may concern:*

Be it known that I, STEENER J. CARLSON, a citizen of the United States, residing at White Butte, in the county of Perkins and State of South Dakota, have invented certain new and useful Improvements in Header-Pushers for Tractors; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in header pushers for tractors, and consists of a simple and efficient apparatus of this nature so arranged that the header or push binder may be attached in advance of a tractor, means being provided for guiding the device as it pushes the header forward.

The invention comprises various other details of construction, combination and arrangement of parts which will be hereinafter fully described, shown in the accompanying drawings and then specifically defined in the appended claims.

My invention is illustrated in the accompanying drawings which, with the numerals of reference marked thereon, form a part of this application, and in which:

Figure 1 is a top plan view, and

Fig. 2 is a side elevation.

Reference now being had to the details of the drawings by numerals:

1 designates the header, shown in dotted lines, having a beam 2 extending rearwardly therefrom and is provided with a pivot 3, to which is secured the hitch which forms the subject matter of this application. This hitch is of L-shaped formation, braced by the braces 5, and is adapted to connect with a tractor, shown conventionally at 6, by the pivot connection 7. Beneath the rear end of the beam 2 the usual caster wheel 8 is provided, with a seat 9 thereon and lever 10 and link 11, which, however, form no part of the present invention. A side-thrust relief in the form of a spring 5' extends from the angle of the hitch to the link 11 and prevents the angular divergence of the parts relative to each other, except under the tension of the spring and for steering purposes. It will be noted that the hitch extends rearwardly of the beam 2 and its connected parts, so that in steering the caster wheel 8 may move adjacent to the hitch and in front of the tractor without engaging the same, sufficient clearance between the hitch and the beam being provided for that purpose.

By the provision of the apparatus embodying the features of my invention, it will be noted that the header binder will be pushed in advance of the tractor and the movement of the header guided by the lever actuated mechanism within convenient reach of the operator upon the seat 9.

What I claim to be new is:

1. The combination with a harvesting machine having a rearwardly extending beam and guiding means for the same, of an L-shaped hitch, pivotally secured to the beam adjacent the machine, and means to attach a tractor to the rear of the hitch.

2. The combination with a harvesting machine having a rearwardly extending beam and guiding means for the same, of an L-shaped hitch pivotally secured to the beam adjacent the machine, and extending in normal parallelism rearwardly of said beam, and means to attach a tractor to the rear of the hitch.

3. The combination with a harvesting machine having a rearwardly extending beam and guiding means for the same, of an L-shaped hitch pivotally secured to the beam adjacent the machine, means to attach a tractor to the rear of the hitch, and a side-thurst relief tending to draw the hitch and beam yieldingly toward each other.

4. The combination with a harvesting machine having a rearwardly extending beam and guiding means for the same, of an L-shaped hitch pivotally secured to the beam adjacent the machine and extending in normal parallelism rearwardly of the same, means to attach a tractor to the rear of the hitch, and a side-thrust relief tending to exert yielding pull between the hitch and the beam.

In testimony whereof I hereunto affix my signature.

STEENER JOHN CARLSON.